(12) United States Patent
Lee

(10) Patent No.: US 10,349,045 B2
(45) Date of Patent: Jul. 9, 2019

(54) THREE-DIMENSIONAL (3D) VIEWING DEVICE AND SYSTEM THEREOF

(71) Applicant: Stanley Shao-Ying Lee, Taipei (TW)

(72) Inventor: Stanley Shao-Ying Lee, Taipei (TW)

( * ) Notice: Subject to any disclaimer, the term of this patent is extended or adjusted under 35 U.S.C. 154(b) by 95 days.

(21) Appl. No.: 15/172,746

(22) Filed: Jun. 3, 2016

(65) Prior Publication Data

US 2016/0360189 A1 Dec. 8, 2016

Related U.S. Application Data

(60) Provisional application No. 62/170,481, filed on Jun. 3, 2015, provisional application No. 62/219,012, filed on Sep. 15, 2015.

(51) Int. Cl.
*H04N 13/344* (2018.01)

(52) U.S. Cl.
CPC ..... *H04N 13/344* (2018.05); *H04N 2213/001* (2013.01)

(58) Field of Classification Search
CPC ........... H04N 13/044; H04N 2213/001; H04N 13/344
See application file for complete search history.

(56) References Cited

U.S. PATENT DOCUMENTS

| 4,559,555 A * | 12/1985 | Schoolman | A61B 1/00048 348/360 |
| 2011/0285607 A1* | 11/2011 | Kim | G06F 1/1616 345/1.3 |
| 2012/0243103 A1* | 9/2012 | Omura | G02B 27/0172 359/630 |
| 2012/0278904 A1* | 11/2012 | Perez | G06F 21/10 726/31 |
| 2015/0243068 A1* | 8/2015 | Solomon | G02B 27/017 345/419 |
| 2015/0370067 A1* | 12/2015 | Denduluri | G02B 27/0101 345/8 |
| 2016/0019423 A1* | 1/2016 | Ortiz | G06K 9/00885 345/633 |

FOREIGN PATENT DOCUMENTS

| WO | WO 2016120510 A1 * | 8/2016 | ............ G02B 27/00 |
| WO | WO-2016120510 A1 * | 8/2016 | ............ G02B 27/00 |

* cited by examiner

*Primary Examiner* — Maria E Vazquez Colon
(74) *Attorney, Agent, or Firm* — Birch, Stewart, Kolasch & Birch, LLP

(57) ABSTRACT

Provided is a three-dimensional (3D) viewing device, comprising a body adapted to connect to a head-worn device, having a space therein, and a base side and opposite lateral sides neighboring thereto, the body comprising two openings symmetrically formed on the opposite lateral sides respectively; two displays disposed in the space; two light sources disposed in the space at the base side, and oriented toward the two displays respectively; and two sets of projection lenses disposed in the space at the two openings respectively, adapted to project the images of the two displays out of the two openings toward the two eyes of the head-worn device user, respectively. A 3D viewing and interacting system thereof is also provided.

21 Claims, 4 Drawing Sheets

THREE-DIMENSIONAL (3D) VIEWING DEVICE AND SYSTEM THEREOF

CROSS REFERENCE TO RELATED APPLICATIONS

This non-provisional application claims the benefit under 35 U.S.C. § 119(e) to U.S. Provisional Application Nos. 62/170,481, filed on Jun. 3, 2015, and 62/219,012, filed on Sep. 15, 2015, all of which are hereby expressly incorporated by reference into the present application.

FIELD OF THE INVENTION

The present invention relates to a three-dimensional (3D) viewing device, in particular, an external 3D viewing device for glasses, and a system thereof.

BACKGROUND OF THE INVENTION

Current developments of personal 3D viewing device focus on those integrated into glasses or a goggle. For example, those disclosed in US 2014/0098009 A1. However, such design makes the glasses or goggle bloated and heavy. Further, the replacement, upgrade or repair of the 3D optical component is inconvenient. Therefore, there is still a need for an improved or novel personal 3D viewing device.

SUMMARY OF THE INVENTION

In one aspect, the present invention provides a three-dimensional (3D) viewing device, comprising: a body adapted to externally connect to a head-worn device, having a space therein, and a base side and opposite lateral sides neighboring thereto, the body comprising two openings symmetrically formed on the opposite lateral sides respectively; two displays disposed in the space; two light sources disposed in the space at the base side, and oriented toward the two displays respectively; and two sets of projection lenses disposed in the space at the two openings respectively, adapted to project the images of the two displays out of the two openings toward the two eyes of the head-worn device user, respectively; wherein the two displays are disposed such that the images thereon are projected toward the two sets of projection lenses by the two light sources, respectively.

According to certain embodiments of the present invention, the displays are DLP microdisplays or liquid crystal displays (LCDs).

In one embodiment of the invention, the light sources are light-emitting diode (LEDs).

According to certain embodiments of the present invention, the two displays and the two light sources are replaced by two self-emitting displays, which are disposed such that the images thereon are projected toward the two sets of projection lenses, respectively. For example, the self-emitting displays are Organic Light Emitting Diodes ("OLED") displays.

In one preferred embodiment of the present invention, the body further comprises a connector formed on the base side, for connecting to the head-worn device. In one specific embodiment, the head-worn device is glasses. Preferably, the body is connected to the bridge of the glasses through the connector. According to another preferred embodiment, the connector is a micro USB connector.

According to the present invention, the body may further comprise one or more cooling holes, for cooling the heat generated by the light sources.

In certain embodiments of the invention, the 3D viewing device further comprises a digital signal processing module, for receiving and processing digital signals from a video signal source.

In another embodiment, the 3D viewing device further comprises a battery.

In another aspect, the present invention provides a 3D viewing and interacting system, comprising: a 3D viewing device of the present invention, and a host device for providing video signals to the 3D viewing device, which comprises a user interaction interface.

According to the present invention, the host device may further comprise a dock for accommodating and charging the 3D viewing device.

According to certain preferred embodiments, the host device is a mobile device. More preferably, the mobile device has a rod shaped body adapted to be grasped by single hand. In one embodiment of the invention, the mobile device further comprises a foldable LCD screen operative to be integrated into the rod shaped body when collapsed. Further, the mobile device may comprise one or more control buttons disposed on a top surface thereof. Of course, a dock disposed at a bottom side of the rod shaped body may be further comprised, for accommodating and charging the 3D viewing device. In another embodiment, the rod shaped body comprises a battery space therein. Preferably, the battery space is adapted to accommodate two AA batteries.

According to the present invention, the user interaction interface may comprise a motion-sensing module and a vibration module.

In certain embodiments of the present invention, the host device further comprises one or more cameras and/or one or more speakers. Preferably, the host device comprises two cameras and two speakers symmetrically disposed on the rod shaped body.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The foregoing summary, as well as the following detailed description of the invention, will be better understood when read in conjunction with the appended drawing. In the drawings.

DESCRIPTION OF THE INVENTION

Unless defined otherwise, all technical and scientific terms used herein have the same meaning as commonly understood by a person skilled in the art to which this invention belongs.

As used herein, the singular forms "a", "an", and "the" include plural referents unless the context clearly dictates otherwise. Thus, for example, reference to "a sample" includes a plurality of such samples and equivalents thereof known to those skilled in the art.

In one aspect, the present invention provides a three-dimensional (3D) viewing device. The 3D viewing device comprises a body, two displays, two light sources, and two sets of projection lenses. The body is adapted to externally connect to a head-worn device. The body has a space therein, and a base side and opposite lateral sides neighboring thereto. Further, the body comprises two openings symmetrically formed on the opposite lateral sides respectively. The two displays are disposed in the space of the body. The two light sources are disposed in the space at the base side, and oriented toward the two displays respectively. The two sets of projection lenses are disposed in the space at the two openings respectively. In addition, the two sets of projection lenses are adapted to project the images of the two displays out of the two openings toward the two eyes of the head-worn device user, respectively. Furthermore, the two displays are disposed in the space such that the images thereon are projected toward the two sets of projection lenses by the two light sources, respectively.

Figure 1:
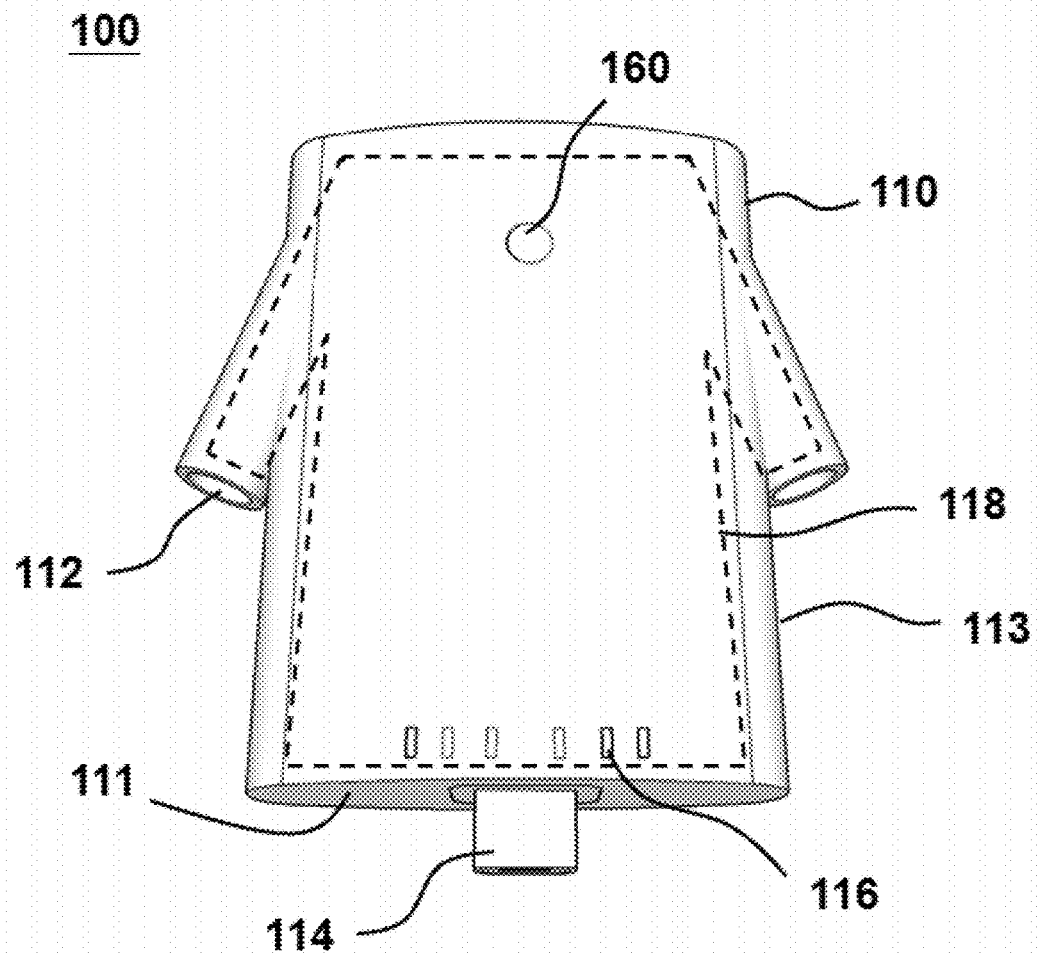
FIG. 1 shows a perspective view of a 3D viewing device of the invention.
Figure 2:
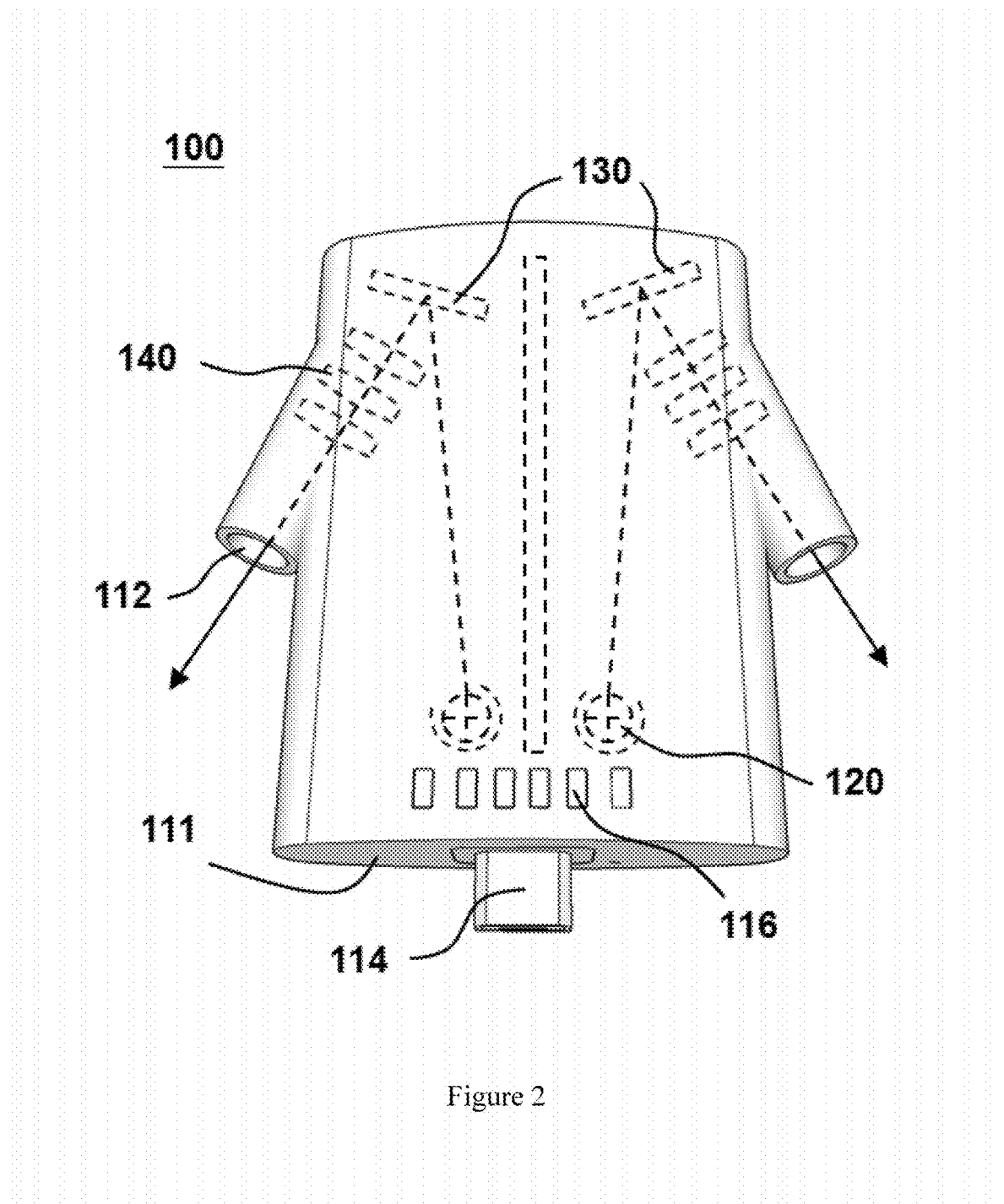
FIG. 2 shows another perspective view of a 3D viewing device of the invention.

Referring to FIG. 1 and FIG. 2, shown is a 3D viewing device 100 of the present invention. The 3D viewing device 100 comprises: a body 110 adapted to externally connect to a head-worn device, having a space 118 therein, and a base side 111 and (two) opposite lateral sides 113 neighboring thereto, the body 110 comprising two openings 112 symmetrically formed on the opposite lateral sides 113 respectively; two displays 130 disposed in the space 118; two light sources 120 disposed in the space 118 at the base side 111, and oriented toward the two displays 130 respectively; and two sets of projection lenses 140 disposed in the space 118 at the two openings 112 respectively, adapted to project the images of the two displays 130 out of the two openings 112 toward the two eyes of the head-worn device user, respectively; wherein the two displays 130 are disposed such that the images thereon are projected toward the two sets of projection lenses 140 by the two light sources 120, respectively.

The displays 130 may be DLP microdisplays used in the DLP (Digital Light Processing) projection system, or liquid crystal displays (LCDs) used in the LCD projection system. The light sources 120 are light-emitting diode (LEDs).

In another embodiment of the present invention, the two displays 130 and the two light sources 120 are replaced by two self-emitting displays (not shown), which are disposed such that the images thereon are projected toward the two sets of projection lenses, respectively. For example, the self-emitting displays may be disposed at similar positions to the two displays 130.

As shown in FIG. 1 and FIG. 2, the body 110 further comprises a connector 114 formed on the base side 111, and cooling holes 116. The connector 114 may be any connector adapted to connect to the head-worn device, and preferably a micro USB connector. The head-worn device may be glasses. For example, the body 110 may be connected to the bridge of the glasses through the connector 114. In addition, the 3D viewing device 100 further comprises a digital signal processing module 160, for receiving and processing digital signals from a video signal source.

In another aspect, the present invention provides a 3D viewing and interacting system, comprising: a 3D viewing device of the present invention, and a host device for providing video signals to the 3D viewing device, which comprises a user interaction interface.

Figure 3:
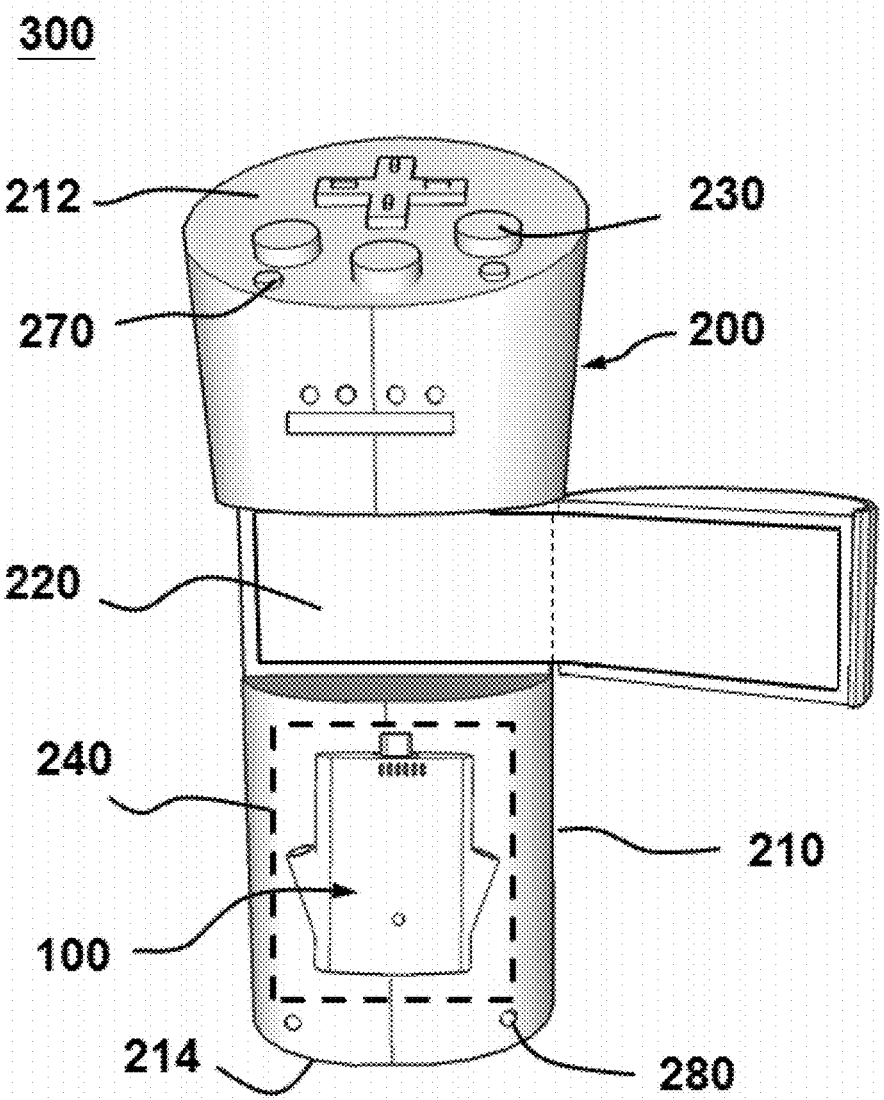
FIG. 3 shows front perspective view of a 3D viewing and interacting system of the invention.
Figure 4:
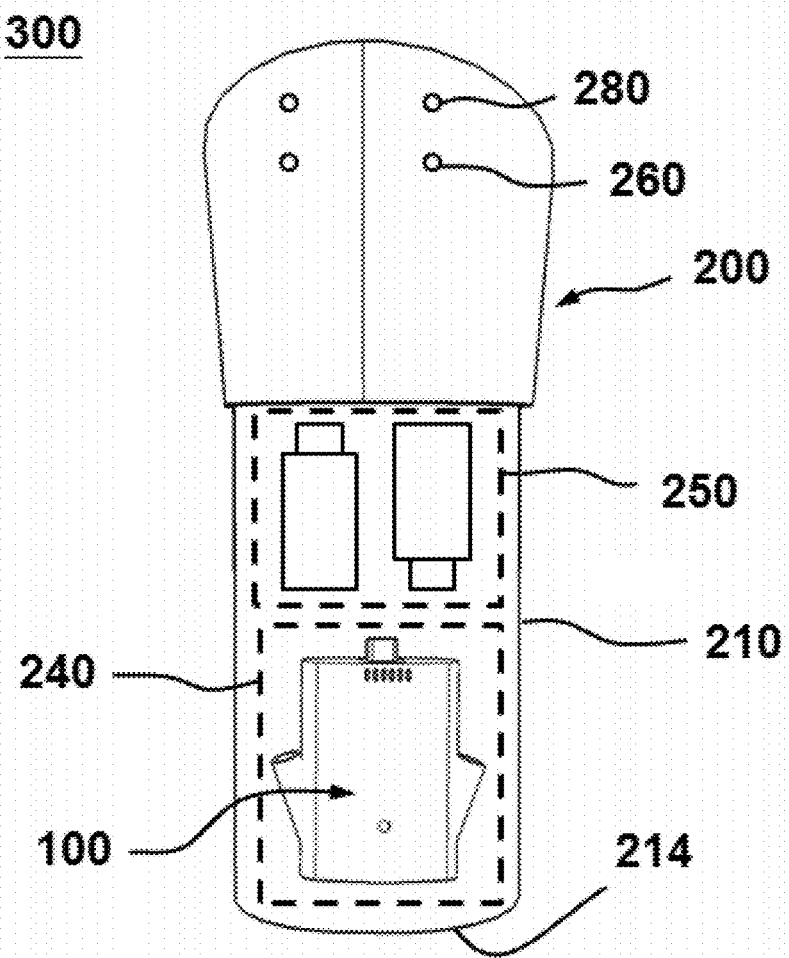
FIG. 4 shows rear perspective view of a 3D viewing and interacting system of the invention.

A 3D viewing and interacting system 300 is shown in FIG. 3 and FIG. 4. The 3D viewing and interacting system 300 comprises a 3D viewing device 100 and a host device 200.

As shown in FIG. 3 and FIG. 4, the host device 200 is a mobile device having a rod shaped body 210 adapted to be grasped by single hand. The host device 200 comprises a foldable LCD screen 220, one or more control buttons 230, a dock 240, and a battery space 250. The foldable LCD screen 220 is operative to be integrated into the rod shaped body 210 when collapsed. The one or more control buttons are disposed on a top surface 212 of the rod shaped body 210. The dock 240 is disposed at a bottom side 214 of the rod shaped body 210. The 3D viewing device 100 may be accommodated in the dock 240 when not in use or charging is required. The battery space 250 is formed within the rod shaped body 210. Preferably, the battery space 250 is adapted to accommodate two AA batteries.

Further, the host device 200 comprises two cameras 260 and two speakers 270 symmetrically disposed on the rod shaped body 210. On the other hand, a host device of the present invention may further comprise one or more microphones. As shown in FIG. 3 and FIG. 4, the host device 200 comprises four microphones 280 each pair symmetrically disposed on the rod shaped body 210.

According to the present invention, the host device 200 is to provide video signals to the 3D viewing device 100, and comprises a user interaction interface. Known user interaction interfaces for mobile devices may be used in the present invention. For example, the user interaction interface may comprise a motion-sensing module and a vibration module as an input and an output of the interaction, respectively.

It is believed that a person of ordinary knowledge in the art where the present invention belongs can utilize the present invention to its broadest scope based on the descriptions herein with no need of further illustration. Therefore, the descriptions and claims as provided should be understood as of demonstrative purpose instead of limitative in any way to the scope of the present invention.

I claim:

1. A three-dimensional (3D) viewing device, comprising:
   a housing adapted to externally connect to a head-worn device, the housing having a surrounding sidewall defining a space therein, a base side and opposite lateral sides neighboring thereto, and two openings symmetrically formed on the opposite lateral sides respectively;
   two displays disposed in the space;
   two light sources disposed in the space at the base side, and oriented toward the two displays respectively; and
   two sets of projection lenses disposed in the space at the two openings respectively, adapted to project images of the two displays out of the two openings toward two eyes of a user of the head-worn device, respectively;
   wherein the two displays are disposed such that the two sets of projection lenses are disposed between the two displays and the two light sources, and the images on the two displays are projected toward the two sets of projection lenses and through the two openings in a direction toward the base side of the housing, by the two light sources, respectively.

2. The 3D viewing device of claim 1, wherein the displays are Digital Light Processing (DLP) microdisplays or liquid crystal displays (LCDs).

3. The 3D viewing device of claim 1, wherein the two displays and the two light sources are replaced by two self-emitting displays, which are disposed such that the images thereon are projected toward the two sets of projection lenses, respectively.

4. The 3D viewing device of claim 1, wherein the housing further comprises a connector formed on the base side, for connecting to the head-worn device.

5. The 3D viewing device of claim 4, wherein the head-worn device is glasses, and the housing is connected to a bridge of the glasses through the connector.

6. The 3D viewing device of claim 1, wherein the housing further comprises one or more cooling holes.

7. The 3D viewing device of claim 1, further comprises a digital signal processing module, for receiving and processing digital signals from a video signal source.

8. The 3D viewing device of claim 1, further comprises a battery.

9. The 3D viewing device of claim 4, wherein the connector is a micro USB connector.

10. A three-dimensional (3D) viewing and interacting system, comprising:
the 3D viewing device according to claim 1; and
a host device for providing video signals to the 3D viewing device, the host device comprising a user interaction interface.

11. The 3D viewing and interacting system of claim 10, wherein the host device is a mobile device.

12. The 3D viewing and interacting system of claim 10, wherein the host device comprises a dock for accommodating and charging the 3D viewing device.

13. The 3D viewing and interacting system of claim 11, wherein the mobile device has a rod shaped body adapted to be grasped by single hand.

14. The 3D viewing and interacting system of claim 13, wherein the mobile device further comprises a foldable liquid crystal display (LCD) screen operative to be integrated into the rod shaped body when collapsed.

15. The 3D viewing and interacting system of claim 13, wherein the mobile device comprises one or more control buttons disposed on a top surface thereof.

16. The 3D viewing and interacting system of claim 13, further comprising a dock disposed at a bottom side of the rod shaped body, for accommodating and charging the 3D viewing device.

17. The 3D viewing and interacting system of claim 11, wherein the user interaction interface comprises a motion-sensing module and a vibration module.

18. The 3D viewing and interacting system of claim 13, wherein the rod shaped body comprises a battery space therein.

19. The 3D viewing and interacting system of claim 10, wherein the host device further comprises one or more cameras.

20. The 3D viewing and interacting system of claim 10, wherein the host device further comprises one or more speakers.

21. A three-dimensional (3D) viewing device, comprising:
a housing adapted to externally connect to a head-worn device, the housing having:
a continuous surrounding sidewall defining a hollow space therein;
a top side, a base side and opposite lateral sides neighboring thereto; and
two tubular sleeves formed by the continuous surrounding sidewall symmetrically formed on the opposite lateral sides respectively, each of the two tubular sleeves being provided with an opening at a distal end thereof open to the hollow space;
two displays disposed in the hollow space at the top side;
two light sources disposed in the hollow space at the base side, and oriented toward the two displays respectively;
two sets of projection lenses disposed in the hollow space at the two tubular sleeves respectively, adapted to project images of the two displays through the two tubular sleeves and out of the two openings toward two eyes of a user of the head-worn device, respectively; and
a connector disposed outside the hollow space at the base side of the housing and configured to externally connect to a head-worn device,
wherein the two displays are disposed such that the two sets of projection lenses are disposed between the two displays and the two light sources within the hollow space, and the images on the two displays are projected toward the two sets of projection lenses and through the two tubular sleeves in a direction toward the base side of the housing, by the two light sources, respectively, and
wherein the continuous surrounding sidewall completely surrounds the two light sources, two displays and two sets of projection lenses.

* * * * *